(12) United States Patent  (10) Patent No.: US 7,989,989 B2
Lust et al.  (45) Date of Patent: Aug. 2, 2011

(54) CIRCUIT HAVING A MICRO CRUSH CAPACITOR

(75) Inventors: Lisa M. Lust, Plymouth, MN (US); Daniel W. Youngner, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 506 days.

(21) Appl. No.: 12/033,942

(22) Filed: Feb. 20, 2008

(65) Prior Publication Data

US 2009/0206678 A1    Aug. 20, 2009

(51) Int. Cl.
*H01H 35/00* (2006.01)
*H03K 17/975* (2006.01)

(52) U.S. Cl. .................................. 307/119; 200/600

(58) Field of Classification Search .................. 307/119; 200/600

See application file for complete search history.

(56) References Cited

U.S. PATENT DOCUMENTS

| 3,530,310 | A | * | 9/1970 | Adelson et al. | 327/467 |
| 3,549,909 | A | * | 12/1970 | Adelson et al. | 327/453 |
| 3,922,563 | A | * | 11/1975 | Penman | 307/116 |
| 7,213,943 | B2 | | 5/2007 | Chung et al. | |
| 7,400,489 | B2 | * | 7/2008 | Van Brocklin et al. | 361/278 |
| 7,538,287 | B2 | * | 5/2009 | Fujii et al. | 200/512 |
| 2006/0196716 | A1 | | 9/2006 | Hawes et al. | |

* cited by examiner

*Primary Examiner* — Michael Rutland Wallis

(74) *Attorney, Agent, or Firm* — Seager, Tufte & Wickhem LLC

(57) ABSTRACT

A start-up circuit having a micro crush capacitor that is operatable with a small pressure. The crush capacitor may be connected to a silicon controlled rectifier or similar device. Applying the pressure to the crush capacitor may turn on the SCR which may in turn activate a sensor. The circuit may be fabricated on a flexible substrate which together may be regarded as a flexible circuit. The flexible circuit may be held down on a back plate with a form plate clamping the circuit at its perimeter edge. The flexible circuit may be held firm with the plates for component insertion and/or circuit testing.

13 Claims, 12 Drawing Sheets ately larger. Membrane pressure switches tend to be
CIRCUIT HAVING A MICRO CRUSH CAPACITOR

BACKGROUND

The present invention pertains to sensors and particularly to thin film sensors. More particularly, the invention pertains to devices for turning on circuits.

SUMMARY

The invention is a start-up circuit for electronics. It may be flex circuit which may held in a form and back plate for inserting components and testing the circuit.

DESCRIPTION

Some battery operated thin film sensors may require covert integration of a manually administered wake-up or start-up circuit. In a low profile form, the sensor may be an ASIC or implemented directly on another thin film substrate. In such case, the start circuit should not be obvious in the sensor's form factor. The circuit may be easily activated without overt mechanisms or additional equipment.

Figure 1:
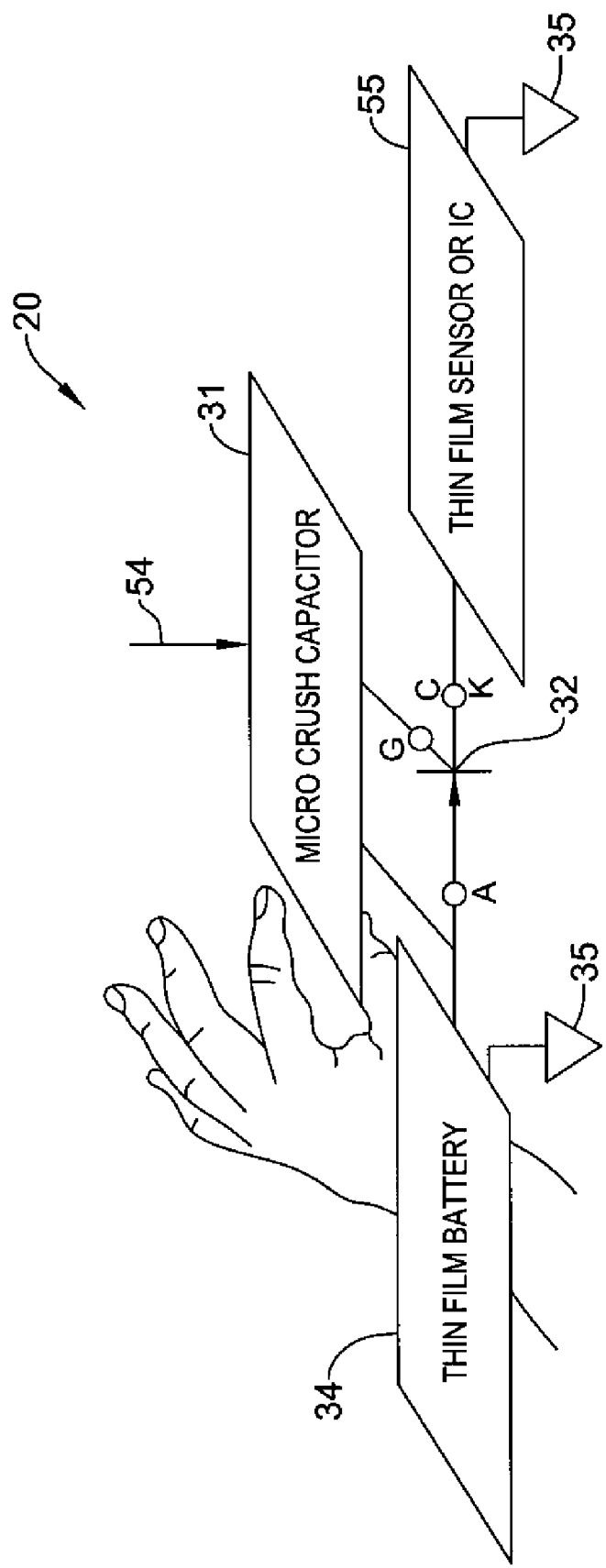
FIG. 1 is a diagram of a start-up circuit having a micro-crush capacitor.

The crush capacitor may override other ways to turn circuits on and off. It may be a MEMS constructed capacitor. It may be receptive to a small pressure in a very small area or a larger area as desired. Membrane pressure switches tend to be significantly larger. The present crush capacitor is not necessarily limited to a finger pressure turn-on as indicated in FIG. 1. Any kind of pressure may turn on the crush capacitor. Air pressure may be one example of activating the circuit via the crush capacitor. The activation may be caused by a very small force upon a very small area of the crush capacitor. The force instead caused by a small object may be another example.

FIG. 1 is a diagram of a circuit 20 implementing a micro crush capacitor 31. The capacitor 31 may have pressure or force of some kind exerted on its surface which in turn effectively shorts the two leads of the capacitor. The leads of the capacitor may be connected to the anode and gate of a silicon controlled rectifier (SCR) 32, respectively. A similar device 2 of 16 may used in lieu of the SCR. The anode may be connected to an output of a battery 34 which may be a thin film battery. The cathode of SCR 32 may be connected to a thin film sensor or other circuit 55. The battery 34 and circuit 55 may have a connection to a voltage reference or ground 35.

The micro crush capacitor 31 may be an air gap capacitor mechanism easily integrated into a variety of thin film technologies. Device 31 may be a thin film capacitor. Device 31 may be a MEMS capacitor. If finger-applied pressure is placed across the electrodes of the capacitor 31, the SCR 32 gate may receive a voltage pulse from the battery 34 switching the SCR 32 into conduction and enabling the sensor circuit 55. The pressure or force may be from a source other than a finger. Depending on the desired form factor of the device, the battery 34, SCR 32, micro crush capacitor 31, and sensor 55 may be integrated onto one substrate.

In this circuit, a low profile battery 34 such as a lithium ion or lithium polymer battery may be placed in series with the SCR 32, as shown in FIG. 1. Implementing the SCR 32 in die form may reduce the circuit dimensions. The gate of the SCR 32 may be connected in series to the battery 34 through a low profile micro crush capacitor 31. The capacitor 31 may be implemented on several different thin film technologies, such as Kapton™ films from Dupont. One kind of a capacitor dielectric may be ambient air. In the thin film configuration, if pressure is exerted on the capacitor 31, then the capacitor plates may be made to short the SCR 32 gate to the battery 34. The voltage pulse delivered to the SCR 32 may push the SCR into conduction and enable the sensor circuit 55. The battery voltage and circuit current need to exceed the SCR's gate trigger voltage and current. Even if the capacitor is inadvertently inactivated, the circuit should remain in operation.

Figure 2:
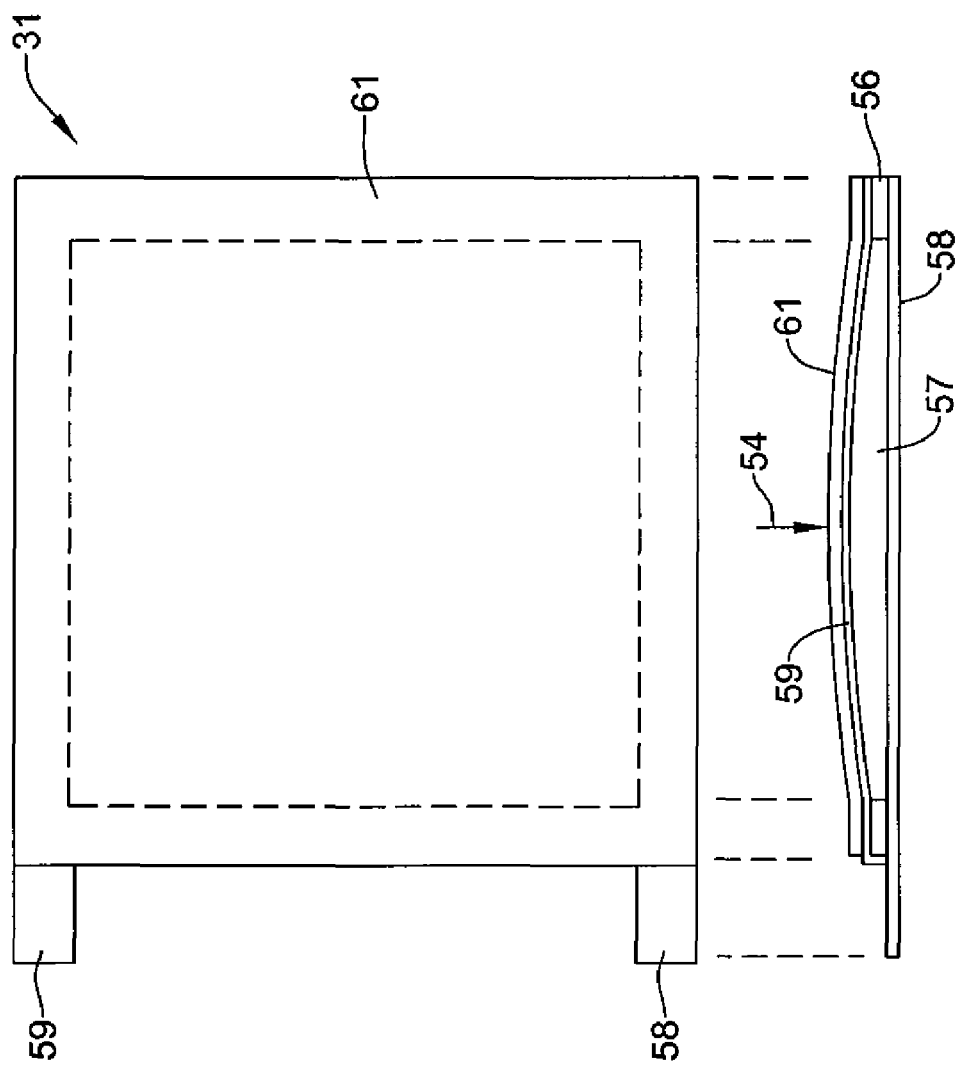
FIG. 2 is a diagram of an illustrative example of the crush capacitor.

FIG. 2 shows an illustrative example of the crush capacitor 31. The Figure is a diagram of top and cross-section views of the crush capacitor 31. The capacitor 31 may have a support 56 about a perimeter of a cavity 57. The support may be situated on a metal plate 58. A metal plate or sheet 59 may be formed over the cavity 57. A sacrificial material may be present in the cavity to support sheet 59. On top of the metal sheet may be a flexible but resilient layer 61 of material adhered to the sheet 59. Then the sacrificial material may be removed from the cavity 57 since the layer 61 holds up sheet 59. The metal may be copper or the like. Metal plates 58 and 59 may have portions that stick out as tabs or leads from the capacitor 31 as shown in the top view. The upper surface of layer 61 may be pressed down until sheet or layer 59 comes in contact with layer 58. After a release of pressure, the layer 61 and sheet 59 may return to their original position away from layer 58.

The crush capacitor may be used in a covert listening device (e.g., a bug). A very small actuator may be desired such as a pinhead-sized capacitor which may be the crush capacitor 31. A paper clip, pencil tip, air pressured flow, and other minute actuating items may cause the crush capacitor 31 to short out or activate the circuit in which it is implemented. The area that the crush capacitor may take up may be, for instance, 100×100 microns (about 4×4 mils). The pressure- or force-sensitive area of the crush capacitor 31 may range from less than 1 square millimeter to a number of square millimeters. Or the capacitor may be larger having dimensions such as in a range of millimeters and areas in a range of a square centimeter or more. The surface of the crush capacitor, subject to a turn-on or shorting pressure, may have a bowed-out or convex shape as shown in FIG. 2. A pressure or force 54 on the capacitor surface may flex the surface down, but after the pressure or force is removed, the surface of layer 61 may return to its bow-shaped position along with layer 59. The layer 61 which is pressed for actuation may have a material with a certain tensile strength that assures the layer's return to an original shape after a removal of the actuating pressure. Between the two metal layers, plates or electrodes 58 and 59 of the capacitor there may be air. There is generally no pressure difference between the inside of cavity 57 and the outside ambient environment of the crush capacitor 31. In lieu of air in the cavity 57, some other fluid-like materials may be used. The capacitor 31 may be tied in with a low current SCR 32. A thin film lithium ion or other like kind of battery 34 may connected into the capacitor-SCR circuit which may provide power to a sensor 55, such as a bug, upon actuation of the crush capacitor 31. The battery 34 may have a potential of about 2.5 to 4.2 volts.

A start up circuit 30 may utilize STMicroelectronics P0102BL silicon controlled rectifier (SCR) 32, a Fairchild FDZ191P P-channel MOSFET 38, a Texas Instruments TPS79328 2.8 volt regulator 45, and a customized crush capacitor 31. When depressed, the capacitor 31 may initiate conduction through the SCR 32 which delivers a battery voltage to the regulator. The SCR circuit 30 may remain on until the shutdown voltage level is reached which may be controlled by resistor 36 and is device dependent. Shutdowns may be set between 2.7 and 2.8 volts. Variations may be based on commercial pressure membrane switch designs and a custom developed MEMs crush capacitor.

Figure 3:
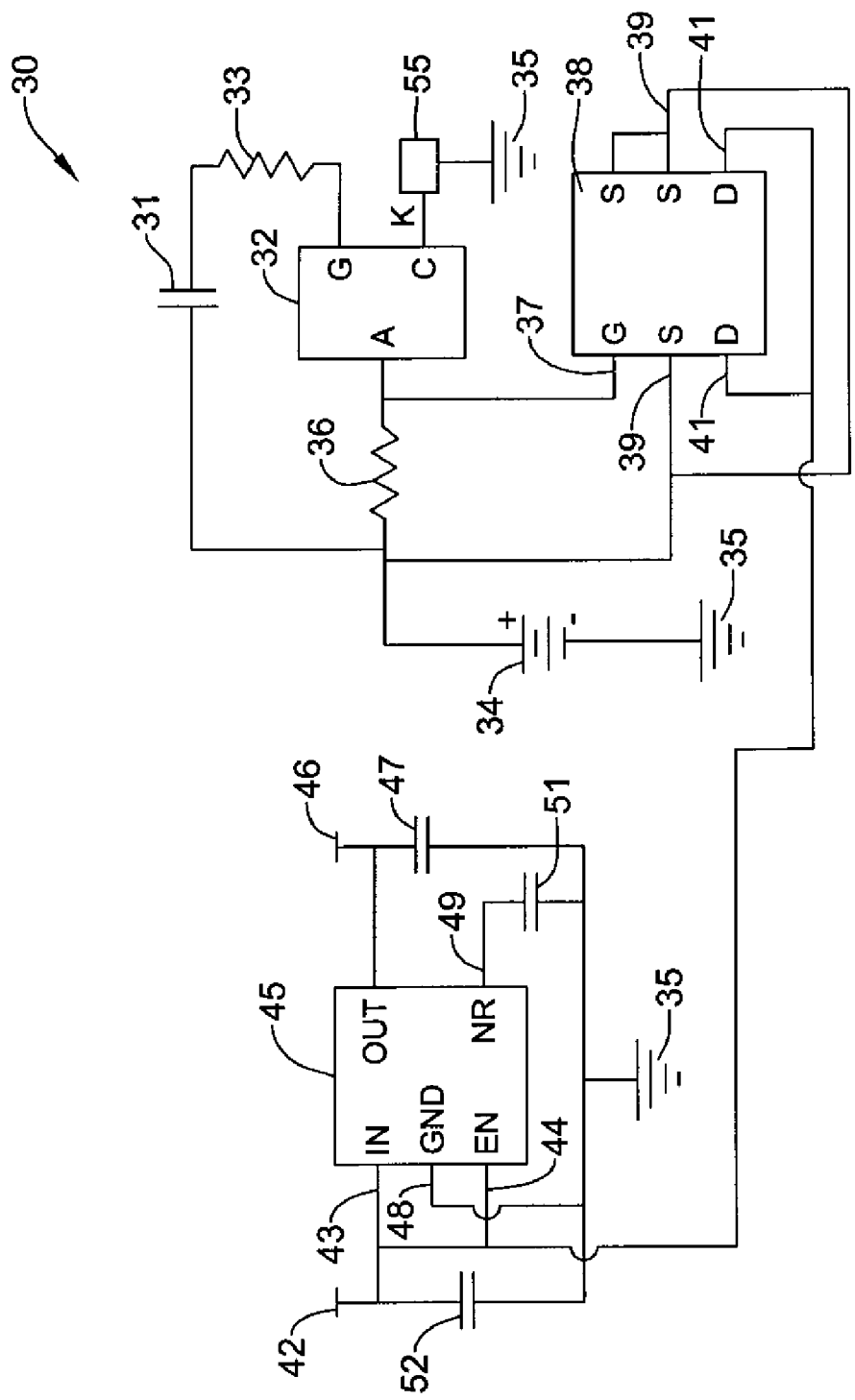
FIG. 3 is a schematic of a start-up circuit having a crush capacitor.

FIG. 3 is a somewhat detailed electronic schematic of circuit 30 having a crush capacitor 31 in an SCR circuit 30. Capacitor 31 may have one end connected to a gate of an SCR 32 via a resistor 33. Resistor 33 may be about one ohm or another value. Capacitor 31 may have another end connected to a positive terminal of a battery 34. The negative terminal of battery 34 may be connected to a reference voltage or ground 35. A positive terminal of battery 34 may be connected to the anode of SCR 32 via resistor 36. Resistor 36 may be about 31 ohms or another value. The anode of the SCR 32 may be connected to a gate 37 of a P-channel MOSFET 38. The cathode of SCR 32 may be connected through a sensor 55 to ground or reference voltage 35. The positive terminal of battery 34 may also be connected to source 39 connections of MOSFET 38. Drain 41 connections may be connected to a positive voltage terminal 42. Voltage terminal 42 may be connected to an IN terminal 43 and an enable (EN) pin 44 of voltage regulator 45. Driving EN pin 44 high may turn on regulator 45 and driving pin 44 low may turn off regulator 45. Regulator 45 may have an output voltage terminal 46. Terminal 46 may be connected to reference voltage or ground 35 via a capacitor 47. Capacitor 47 may be about 2.2 micro farads or another value. A ground terminal 48 of regulator 45 may be connected to ground or reference voltage terminal 35. An NR terminal 49 may be connected to ground or reference voltage 35 via a capacitor 51. The NR (noise reduction) terminal 49 connected to capacitor 51 may bypass noise generated by an internal band gap to improve power-supply rejection and reduce output noise. Capacitor 51 may have a value of about 0.01 microfarad or another value. A capacitor 52 of about 0.1 micro farad, or another value, may be connected between a voltage terminal 42 and reference voltage or ground 35. Terminal 46 may provide voltage supply which may be used in conjunction with a sensor or integrated circuit (IC) 55.

The micro-crush capacitor 31 may be shorted with a moderate pressure enabling the SCR 32. With a release of the pressure, the capacitor 31 may reopen and the SCR may remain actuated. The SCR 32 may continue to conduct until the regulator 45 shuts down the circuit. The SCR may be put into conduction by an application of $V_G > 0.8$ volt and $I > 1$ milliamp. To avoid the 0.8 voltage drop of the SCR 32, a P-channel MOSFET 38 may be used.

The regulator 45 may under go a quasi shutdown at about 2.47 volts at which it draws about 5 micro amps of current. These voltage and current levels may disable the SCR 32. This condition should be effected before transmitter batteries are recharged or otherwise the circuit will continue to draw on the battery 34.

The sensor or IC 55 may be fabricated on a flex circuit. The flex circuit may be held down with a thin rigid metallic form (plate) or frame. Components of circuit 30 may have various kinds of packaging. SCR 32 may be a decapsulated part. The crush capacitor 31 may be a wire-bonded part. MOSFET may be a flip chip part having dimensions of about 1.5×1.0×0.5 millimeters. The battery 34 may be a thin film battery.

Figure 4:
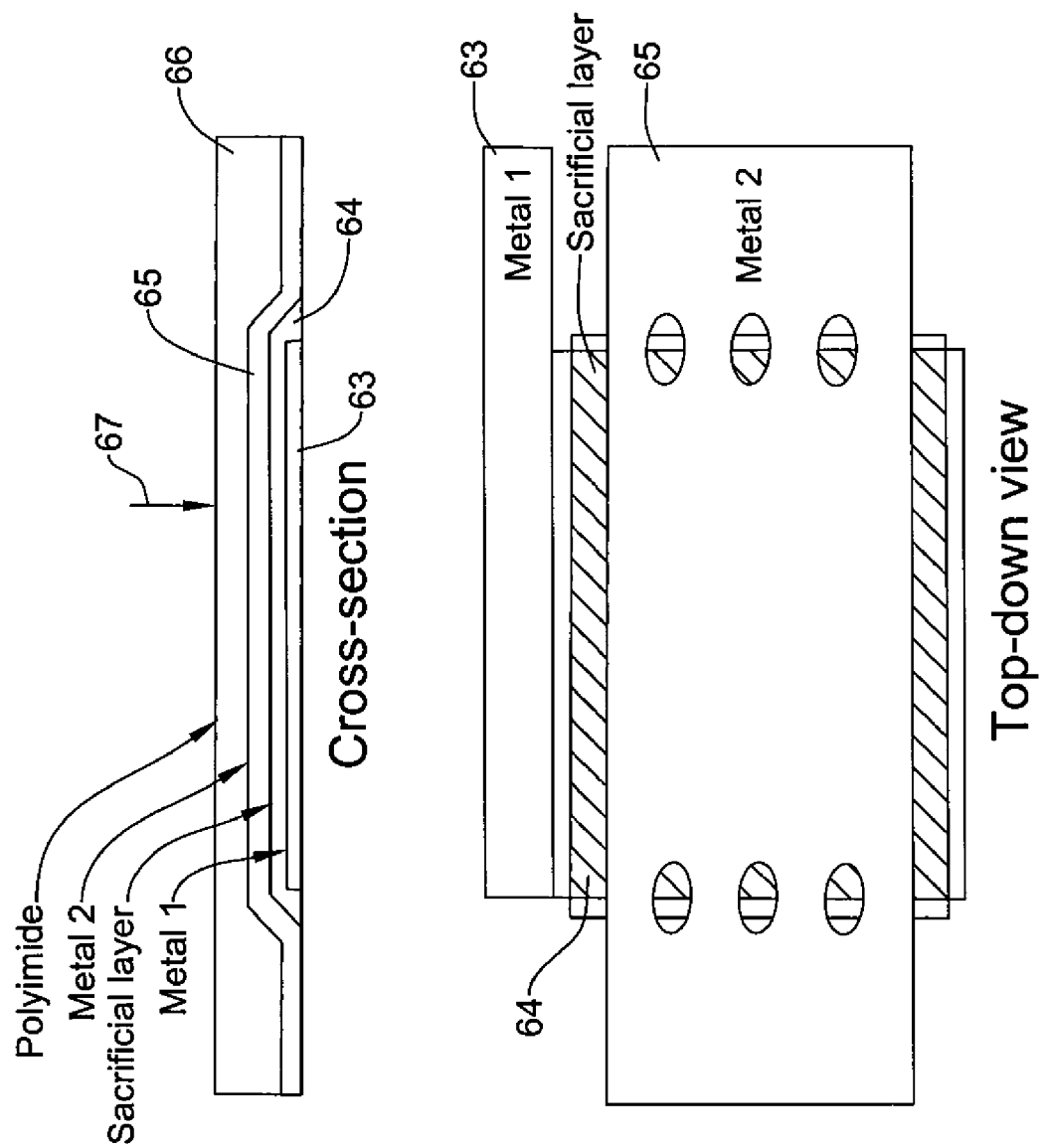
FIG. 4 is a diagram showing elements for fabricating a micro crush capacitor.

In view of FIG. 4, the micro crush capacitor may be made with the following process flow. A first metal (e.g., copper) 63 may be provided, patterned and etched. Then a sacrificial layer 64 (LOR=PMGI) may be applied on first metal 63 and patterned. A second metal (e.g., copper) 65 may be applied on the sacrificial layer 64, patterned and etched. A plastic, polymer, polyimide, Kapton™, and/or the like may be applied. In an illustrative example, a polyimide coating 66 may be applied on the second metal 65. The sacrificial layer 64 may be removed or ashed out (e.g., with an $O_2$ plasma) resulting in a cavity between the first metal 63 and second metal 65. For operation, a light force 67 may be sufficiently applied on the polyimide layer 66 to create a momentary short in the capacitor between the first metal and second metal.

Figure 5:
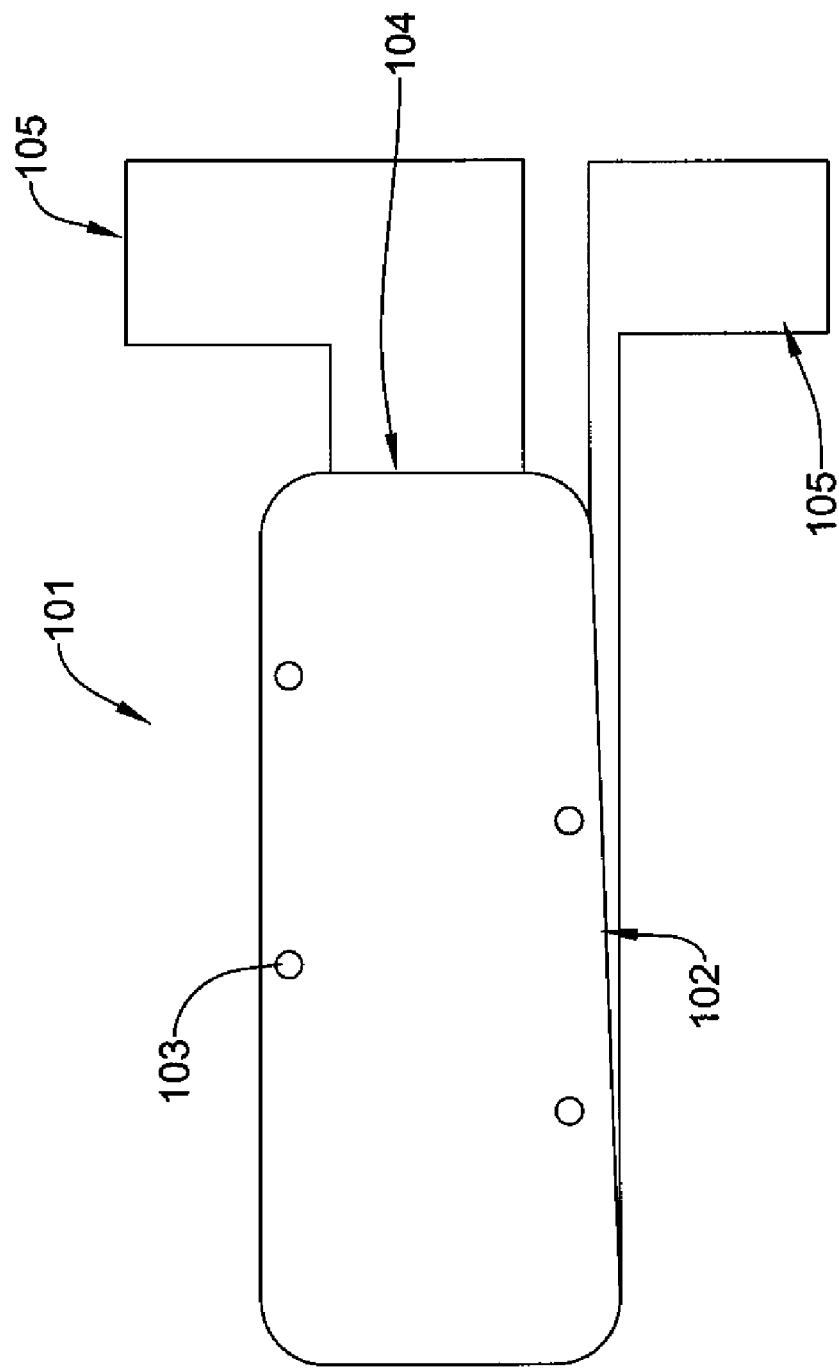
FIG. 5 is a diagram of another version of a crush capacitor.
Figure 6:
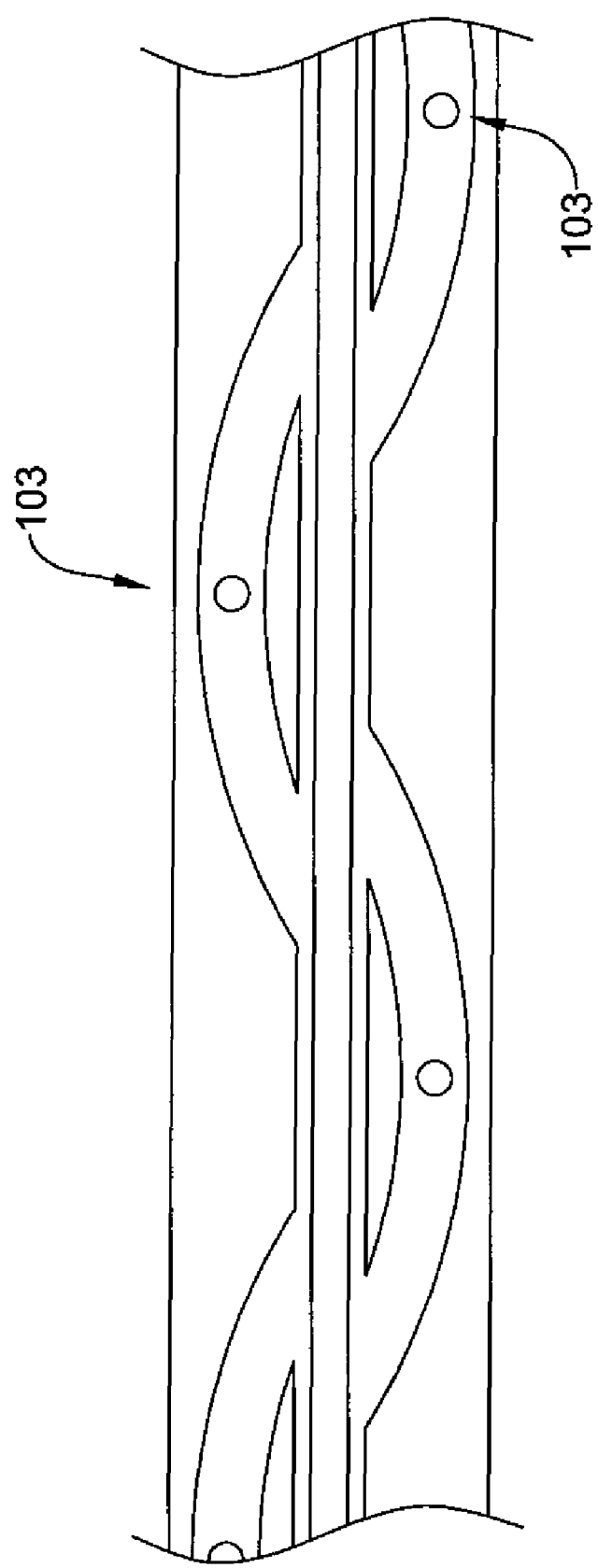
FIG. 6 is a close-up view of holes used for etching access to the crush capacitor cavity.

FIG. 5 is a diagram of another version of a crush capacitor 101. A top layer 102 with possible holes 103 for etching access is shown. After poly removal (i.e., sacrificial material), there may be an air gap 104. Also shown are the electrodes or leads 105 of the crush capacitor 101. FIG. 6 is a close-up view of holes 103 with channels used for etching access to the air gap or cavity.

Figure 7:
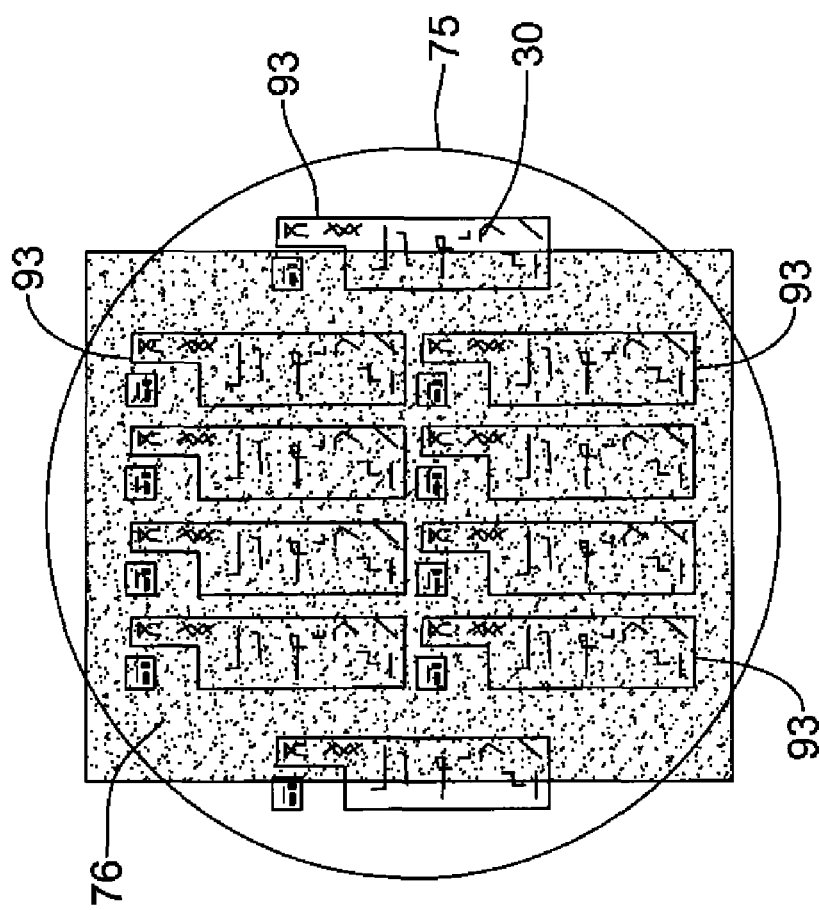
FIG. 7 is a diagram of a substrate film stretched taught across a fixture for processing circuits.

One or more flex circuits 93 may be made starting with 12.5 micron (about 0.5 mil) Kapton film 76 coated on both sides with 3 to 5 microns of copper. A flex circuit 93 may include the electronics of circuit 30 or other circuits. As shown in a substrate diagram of FIG. 7, the Kapton film 76 may be stretched taught across a custom fixture 75 enabling the Kapton film to be processed much like a six inch silicon wafer. This Figure shows ten completed flex circuits 93 on the six inch fixture 75.

Figure 8:
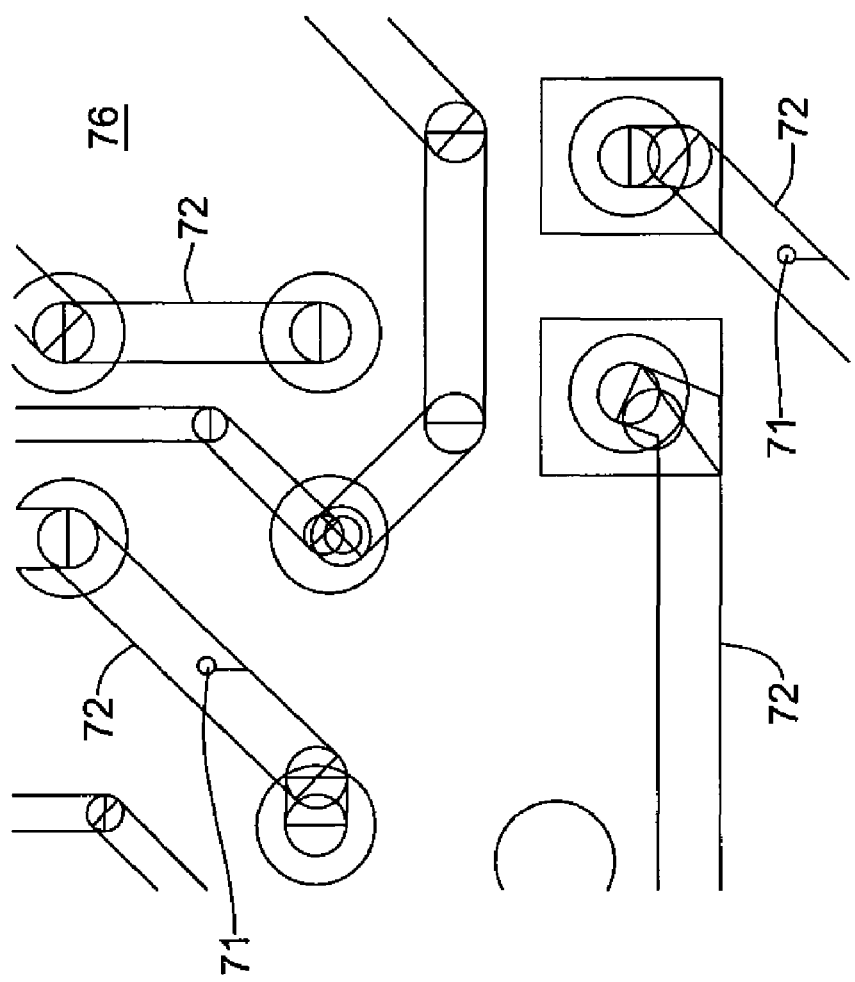
FIG. 8 is a diagram of a front-side metal pattern showing locations of front-to-back vias.

FIG. 8 is a diagram of a front-side metal pattern showing locations of front-to-back vias 71. The fabrication sequence may begin by patterning and wet-etching the top copper metal layer. There may be locations in the metal pattern where one would wish to have front-side to back-side electrical connections through vias or small holes 71 which may be patterned and etched in the middle of some of the metal lines 72. Vias 71 may be photo-patterned and plasma-etched through the Kapton substrate or film 76 to the back-side copper, then a mechanical shadow mask with slightly over-sized holes may be placed over the holes, and then the Kapton™ and metal may be evaporated through the shadow mask, thereby creating an electrical connection from the back-side copper to the patterned copper on the front. Bond pad metal for bond pads may be deposited onto the front-side Kapton through the same shadow mask and in the same process step as the front-to-back connections. The process may be completed by spin-applying a protective polyimide layer over the entire substrate and then patterning and plasma-etching holes through the protective layer down to the bond pads.

Figure 9:
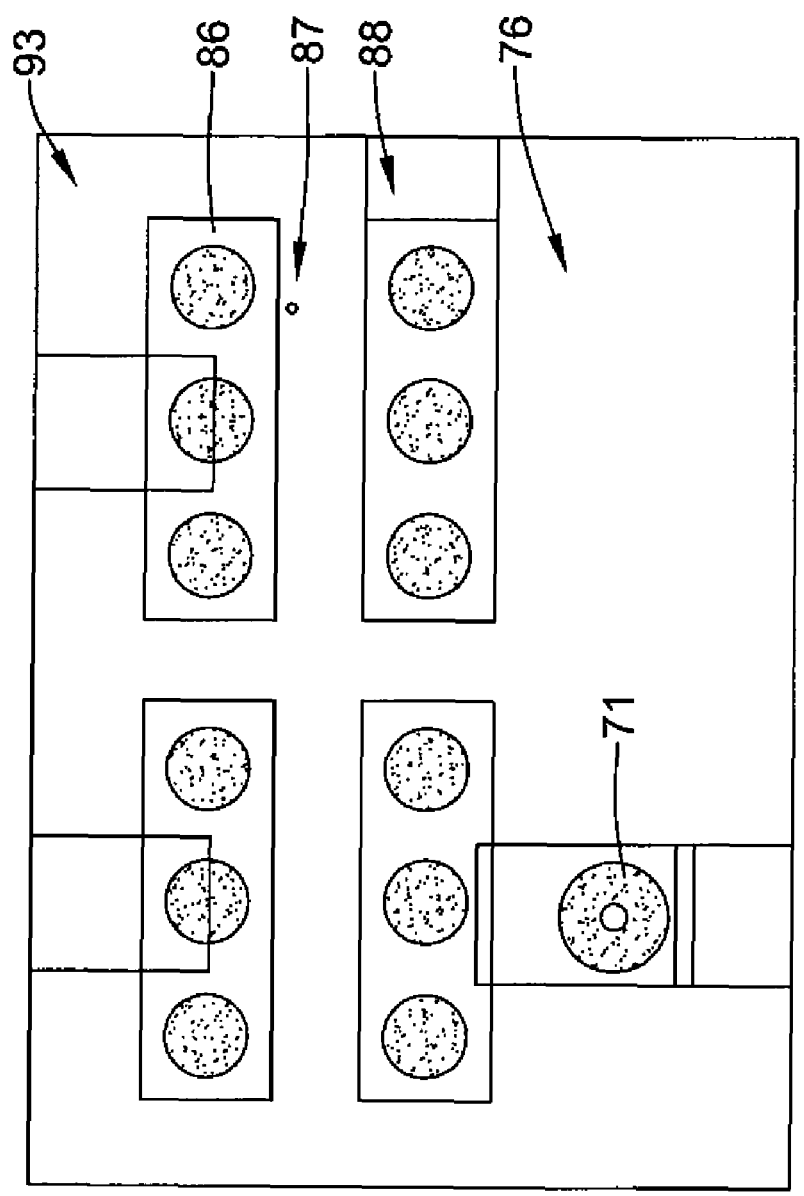
FIG. 9 is a diagram of layers used in making the flex circuits.

FIG. 9 shows a layout plot of the layers used in making the flex circuits 93. A flex circuit 93 may have solder bonding pads 86, openings 87 in the upper polyimide, interconnect metal 88, a flexible Kapton substrate 76, and the through-substrate vias 71 (for electrical connections to a back-side ground plane).

Figure 10:
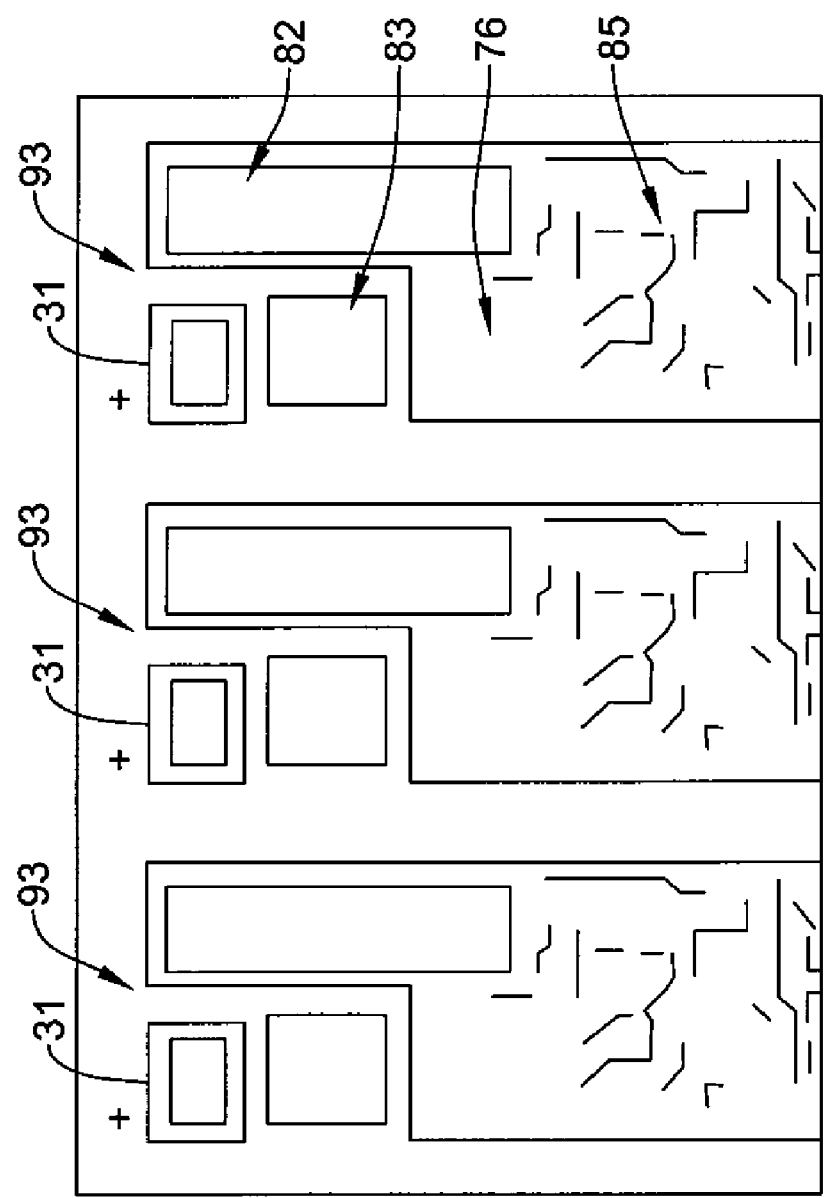
FIG. 10 is a diagram of a plot of having a group of several flex circuits on a substrate containing electronics.

FIG. 10 is a diagram of a mid-level magnification plot of the circuit showing a version of three flex circuits 93 containing the electronics of circuit 30. The diagram shows a crush capacitor 31, battery connections 82, the alignment marks 83, a flexible Kapton substrate 76, conductive lines and items 85 and components of circuit 30 on the flex circuit 93.

Circuit traces generated on the flexible substrate 76 of circuits 93 may constitute a reliable approach for populating the circuit with active and passive components and then testing the circuit functions prior to insertion into a product. Unlike traditional rigid printed circuit boards, ultra thin flexible circuits 93 may be extremely fragile and not necessarily withstand conventional probes and clamps applied to test points within the circuit without incurring structural and/or electrical damage.

An approach for mounting and testing circuits that does not cause structural and electrical damage to the circuits may be implemented. A rigid metallic form 94 may be used to clamp and hold the flexible or flex circuit 93 flat to a back plate 95 and connect it with a circuit ground to prevent electrostatic damage during circuit populating. The form 94 may be relatively thin so as to allow front side access to the circuit 93 traces but not necessarily require excessive border area for a clamping and holding the flex circuit. The form (plate) or frame 94 may have a longitudinal length 101 to thickness 102 ratio greater than 20. An example ratio may be about 40 or so.

Figure 11:
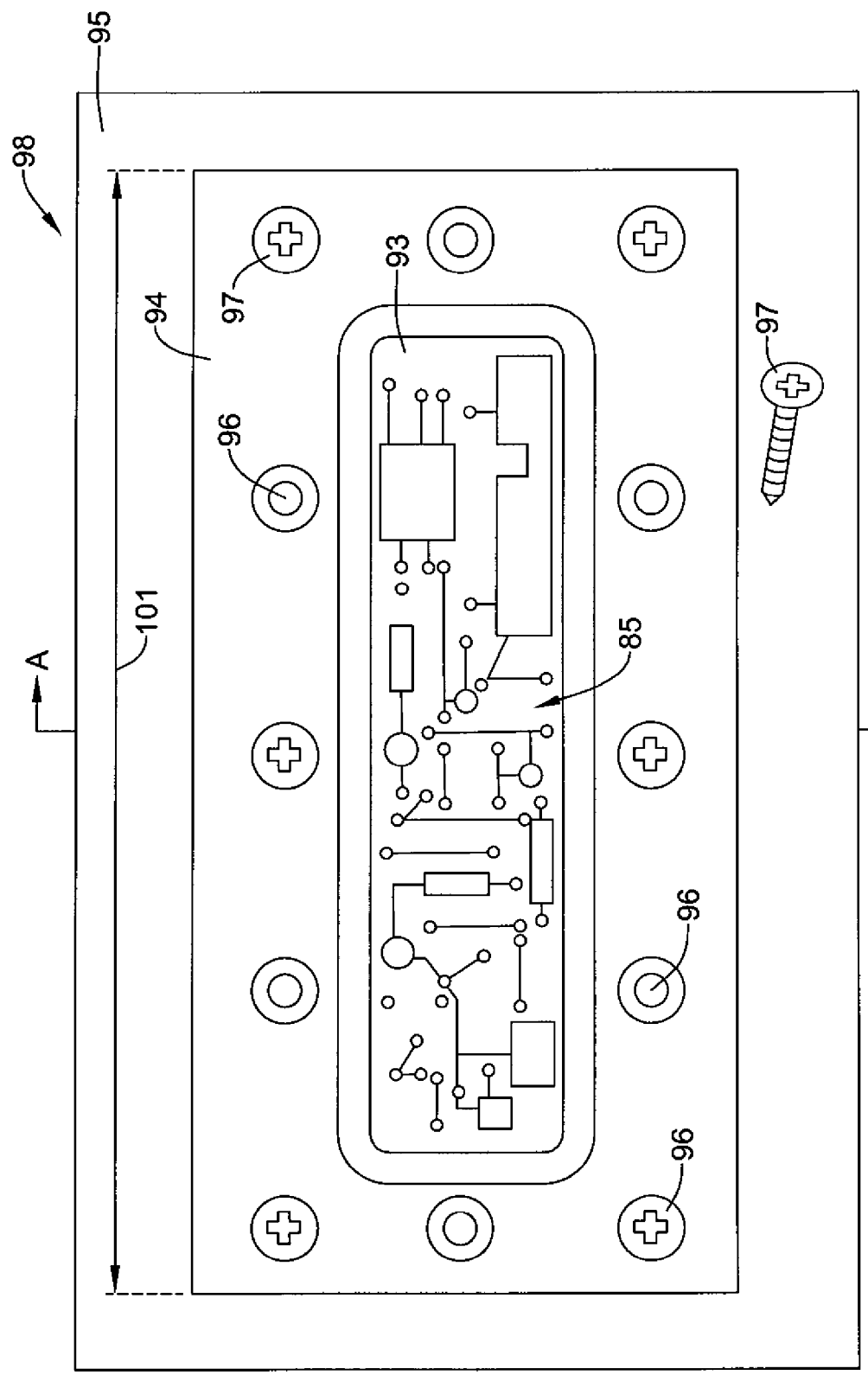
FIG. 11 is a diagram of a flexible circuit holding fixture.

The back plate material may be machined to result in a solid and rigid metallic support plate 95 on which the flexible circuit 93 is placed. Screw holes 96 may be tapped on the outside edge of the plate 95. The metallic form 94 may be placed on top of the back plate 95 with screws 97 for clamping the edge of the circuit 93 down but not necessarily inhibiting access to any of the traces. Other mechanisms may be used for holding the metallic form 94 to the back plate 95. The metallic form 94 may be connected to a ground trace. The form 94 and plate 95 may constitute a fixture 98 as shown in FIG. 11.

Figure 12:
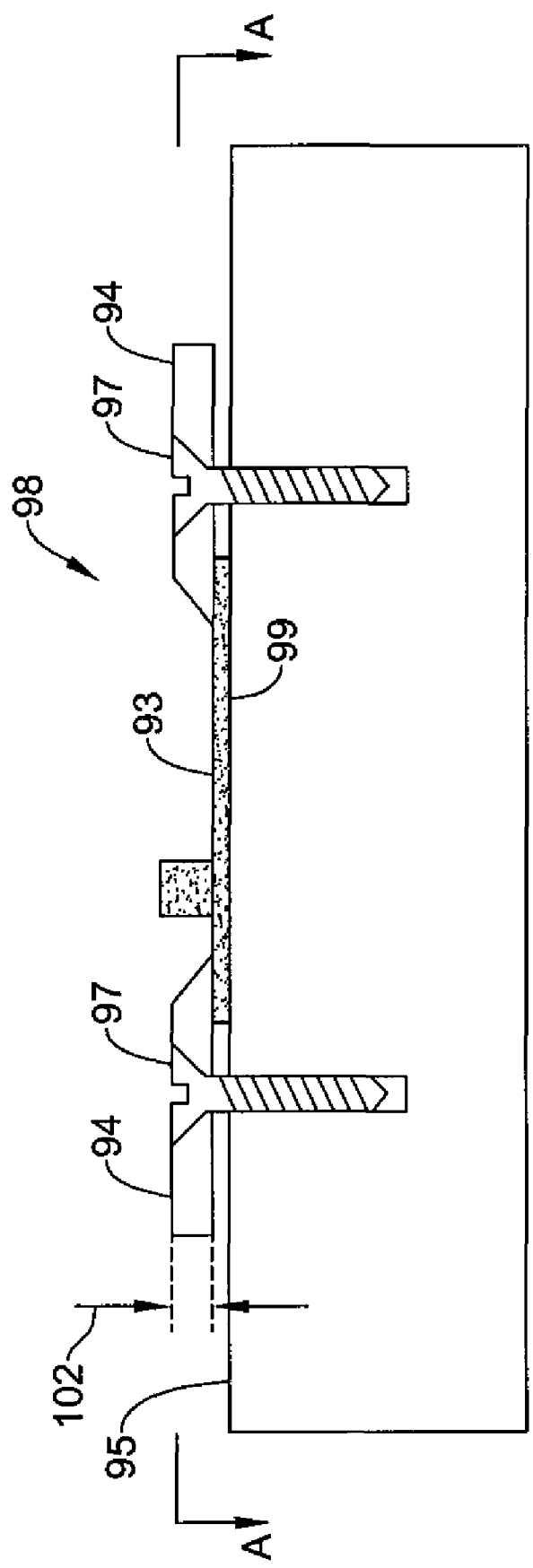
FIG. 12 is a cross-section view of the flexible circuit holding fixture.

A cross-section of fixture 98 is shown in FIG. 12. This fixture may enable passive and active components to be safely soldered, flip chip bumped, or wire-bonded to the substrate. It may also enable the substrate to be held at elevated temperatures during bonding or testing processes. For testing, the fixture may be easily inserted into a microprobe station. The microprobe station may be grounded to the fixture and various parts of the circuit may be safely probed without inducing damage. In some applications, there may be a full or partial insulating layer 99 between back plate 95 and circuit 93 to prevent shorting or unwanted grounding of some of the back terminals, traces, bumps or the like. The insulating layer may facilitate testing of circuit 93 while being held securely in fixture 98.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A start-up circuit comprising:
a switch that is for being connected across a first voltage, turning on upon receipt of a second voltage and remaining on upon a termination of the second voltage; and
a crush capacitor connected to the switch;
wherein:
the switch is a silicon controlled rectifier (SCR);
a first terminal of the SCR is an anode;
a second terminal of the SCR is a gate;
a third terminal of the SCR is a cathode;
a first terminal of the crush capacitor is connected to the first terminal of the SCR; and
a second terminal of the crush capacitor is connected to the second terminal of the SCR.

2. The circuit of claim 1, wherein:
applying a force to the crush capacitor provides the second voltage to the switch; and
removing the force from the crush capacitor disconnects the second voltage from the switch.

3. The circuit of claim 1, wherein the crush circuit has a force-sensitive area less than one square millimeter.

4. The circuit of claim 1, wherein:
the first voltage is provided by an electrical source having a first terminal connected to the first terminal of the SCR;
a second terminal of the electrical source is connected to a reference terminal; and
the third terminal of the SCR is connected to the reference terminal via an electrical load.

5. The circuit of claim 4, wherein:
the electrical source is a battery; and
the load is a sensor circuit.

6. The circuit of claim 1, further comprising:
a back plate; and
a frame; and
wherein:
the start-up circuit is a flexible circuit;
the flexible circuit is situated on the back plate; and
the frame is situated on the back plate holding the flexible circuit to the back plate at a perimeter edge of the flexible circuit.

7. The circuit of claim 6, wherein the flexible is held in place relative to the back plate for mounting components and/or testing the flexible circuit.

8. A start-up circuit comprising:
a switch that is connected across a first voltage and is configured to turn on upon receipt of a second voltage and remain on upon a termination of the second voltage, wherein the switch is a silicon controlled rectifier (SCR);
a crush capacitor connected to the SCR;
an electrical load connected to the SCR; and
an electrical source connected to the SCR switch, wherein the electrical source is configured to provide the first voltage;
wherein:
an anode of the SCR switch is connected to the electrical source;
a gate of the SCR is connected to a first terminal of the crush capacitor;
a cathode of the SCR is connected to the electrical load; and
a second terminal of the crush capacitor is connected to the anode of the SCR.

9. The start-up circuit of claim 8, wherein:
the crush capacitor is configured to provide the second voltage to the SCR when a force is applied thereto; and the crush capacitor is configured to disconnect the second voltage from the SCR when the force is removed.

10. The start-up circuit of claim 8, wherein the crush circuit has a force-sensitive area less than one square millimeter.

11. The start-up circuit of claim 8, wherein:
the first voltage is provided by the electrical source having a first terminal connected to the anode of the SCR;
a second terminal of the electrical source is connected to a reference terminal; and
the cathode of the SCR is connected to the reference terminal via the electrical load.

12. The start-up circuit of claim 8, wherein:
the electrical source is a battery; and
the electrical load is a sensor circuit.

13. A start-up circuit comprising:
a switch connected across a first voltage, turning on upon receipt of a second voltage and remaining on upon a termination of the second voltage, wherein the switch is a silicon controller rectifier; and
a crush capacitor connected to the switch;
wherein:
a first terminal of the crush capacitor is connected to a first terminal of the SCR; and
a second terminal of the crush capacitor is connected to a second terminal of the SCR.

\* \* \* \* \*